March 1, 1955 B. DARROW 2,703,128
PNEUMATIC TIRE
Filed Sept. 27, 1950
FIG. 1
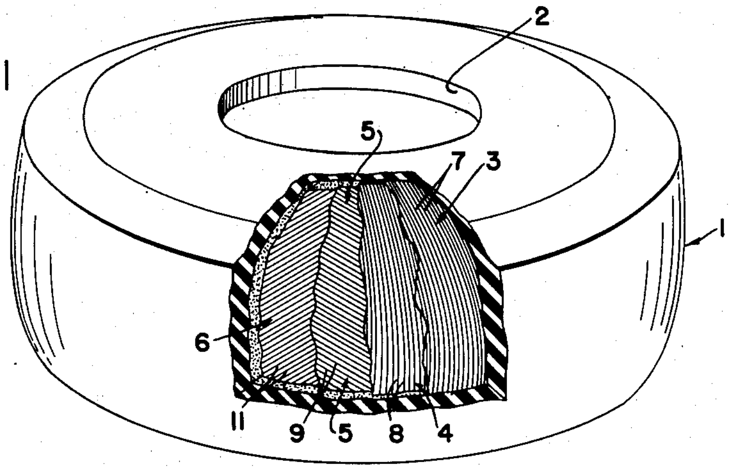
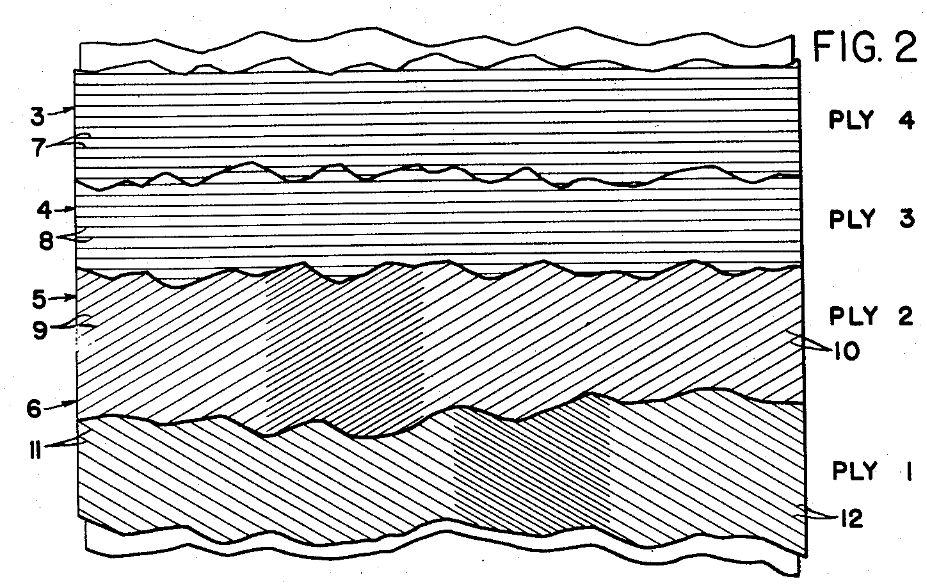
FIG. 2
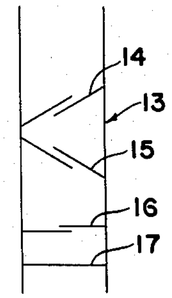
FIG. 3
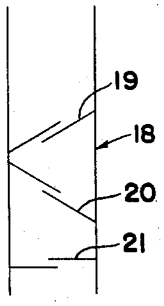
FIG. 4
INVENTOR.
BURGESS DARROW
BY Oldham & Oldham
ATTORNEYS

United States Patent Office 2,703,128

Patented Mar. 1, 1955

2,703,128

PNEUMATIC TIRE

Burgess Darrow, Summit County, Ohio

Application September 27, 1950, Serial No. 187,025

2 Claims. (Cl. 152—356)

This invention relates to improvements in pneumatic cord tires and particularly to the paths of the cords, some crossing the tire on the bias and some running straight across or nearly straight across the tire.

Pneumatic cord tires, with a few exceptions some of which will be mentioned, are constructed with all cords on the bias. Cords begun at one bead follow an oblique path, for example to the right across the tire to the opposite bead. Other cords follow an oblique path to the left, thus a balanced tire results.

The primary object of placing cords on the bias is to provide lateral stability for the tire, or in other words provide good steering characteristics.

It has long been known that if all cords in a tire follow a path straight across, instead of on the bias, the resulting tire is impractical because of instability. However, such a tire possesses a number of desirable properties, namely:

Such a tire gives an extremely soft and easy ride.

Such a tire is stronger and more bruise resistant for a given amount of cord employed, or if the strength is made equal to a bias ply tire the tire with cords straight across will require less cord.

When the cords are straight across the tire, the cords themselves are subject to less compression and are consequently more durable.

A few bicycle tires have been made with all the cords straight across the tire because it was desirable from a ride or cost standpoint and the lack of stability could be tolerated. The standard practice for bicycle tires, however, is to place all cords on the bias.

One European company of France has marketed a comparatively small number of automobile tires during the last year or two in which two plies are employed in place of the usual four plies and all cords run straight across the tire. To provide steering stability, the tires are reinforced in the tread region with several layers of wire cord in the form of narrow strips but this in turn tends in some degree to offset the easy ride that would ordinarily result by using cords straight across.

Many attempts have been made to stabilize a tire having all cords straight across by adding bias strips in the form of reinforcements in the sidewalls but such means are ineffective.

With my invention, I use some plies of cord on the bias and other plies with cords running straight across the tire. The cords running straight across do not contribute a great deal to the stability of the tire but do provide strength with an economical use of material. Such a tire with part bias and part straight across cords will not necessarily give a softer ride than an all bias tire because of the presence of some bias cords, but at least two advantages will remain as a result of the straight across plies. The straight across plies give extra bursting strength in the tire because of their direction which may be translated into a cord saving, or a stronger tire. Also, the straight across cords will be subject to less compressive stresses and will have extra durability on this account. The bias cord plies give the tire the desired steering stability.

The conventional and economical way to build tires is to build them drum shaped on a drum followed by a shaping operation. The drum width for any given size tire depends on the cord angle desired in the finished tire and no one drum width under conventional practice is suitable for both bias cords and straight across cords. The straight across cords would require a drum several inches narrower than bias cords, actually about two inches narrower in the case of a 7.50–15 tire.

One way to build a combination bias and straight across cord tire would, of course, be to build two separate units, one with bias plies and the other with straight across plies and after each is shaped, place one inside the other. However, this would be prohibitive from a cost standpoint.

In a recent separate patent application, filed concurrently herewith Ser. No. 187,026, filed September 27, 1950, I have shown a way that bias and straight across cords can be built together on a given drum, which method will now be briefly explained. I have already pointed out that straight across plies call for a drum width several inches narrower than bias plies. To build the combination bias and straight across ply tire all in one operation, a relatively narrow drum of a width suitable for the straight across plies is selected. Bias plies of a width to fit the drum are applied to the drum but such plies are each made up of two approximate half plies with a lap splice several inches width running lengthwise of the ply. Straight across plies are then placed over the bias plies. In the shaping operation that follows, the bias plies slip several inches at the lap splice to provide the extra width or material that the bias ply requires, and all cords are pulled into the same alignment as though the cords were continuous. After the splice slips there is to be a certain overlap remaining to give the splice the same strength as though the cords were continuous. 6.70–15 tires have been built with 2½" laps in the bias plies as they were applied to the drum and these laps slipped down to ¾" in the finished tire with no difficulty.

In calculating how much lap to use in the spliced bias plies as they are applied to the drum, it is necessary to take into account the amount of splice width desired in the finished tire, the amount the drum has been narrowed to make it correct for the straight across plies, and finally the manner in which the spliced bias plies slip at their splices as effected by the angle of the bias plies.

The combination of bias and straight across cords in a single tire and in a single drum building operation is applicable to all sizes of tires. It may be desirable to place the straight across plies on the inside of the tire, on the outside, or somewhere in the middle of the ply arrangement, but placing at least one of the straight across plies on the outside is desirable to prevent the tread from being distorted as it might be if it were next to a ply that was lapped.

Tires are customarily built with all bias cords crossing the center of the tire in the tread region at approximately 47 and 52 degrees in the finished tire. Racing tires may run up to as high as 60 degrees while some special tires may have been sold commercially where the the cord angle was perhaps as low as 30 degrees.

In referring to straight across cords in this specification, I mean cords at zero degree of bias but cords up to as high as 15 degrees to 20 degrees of bias might be considered as comparatively straight across. The angle referred to is the acute angle in the finished tire formed between a cord at the center of the tread region and an imaginary line crossing the cord at the center of the tread region and parallel to the axis of the tire.

Previously I have indicated that the straight across plies are not split or made in two halves whereas the bias plies are split and made in two halves with a lap splice. Actually, of course, all plies can be split and suitable splices made in the plies as, or before they are applied to the drum. If all plies are split, the splices in the straight across plies will be relatively narrow whereas the splices in the bias plies will initially be extremely wide, as previously described.

My novel tire with some plies on the bias and some straight across is suitable where all cords are of a textile character, for example, rayon, or cotton, or it is suitable where the straight across cords are made from steel, or other suitable metal and the bias plies of some textile material.

I wish to call particular attention to the use of straight across steel cords. When steel cords are used on the bias certain compression stresses, when the tire is deflected, are very damaging to the cord, particularly in passenger tires where the tire deflection is high. Using steel cords straight across the tire instead of on the bias eliminates most of the compressive action and the life of the steel cord is prolonged even under cases of high deflection.

I would like to elaborate on the savings in cord material by my invention and will use, for example, a 4 ply passenger tire, size 7.50–15. Assume some standard ply material to start with.

1. If two inside plies are on the bias and each ply is made in two halves with a ¾" lap splice in the finished tire there will be a penalty or loss of 1½" of ply material.

2. The two outside straight across plies are each approximately 2" narrower than bias plies would have to be for the same tire. This in itself saves 4" of ply material.

3. The tire with two bias plies and two straight across plies will be much stronger from a burst standpoint than a tire with four bias plies.

*a*. For one thing, there will be about 15% more cords crossing the tire from bead to bead in a unit circumferential length of a straight across ply than there would be in a bias ply where the cords cross the drum at an angle say 30°.

*b*. A straight across ply lays in a better direction to withstand bursting stresses than a bias ply crossing the finished tire at say 50°. Just how much of a factor this is is undetermined, but a conservative estimate would be 20%.

*c*. Altogether the two straight across plies contribute 35% more resistance to burst than two bias plies, which is 17½% figured against all four plies.

Instead of building a tire of two plies of bias cord and two plies of straight across cords that is 17½% stronger than a conventional all bias tire, 17½% less cord either in size or in spacing could be used which, together with the ply width saving mentioned above, would make an appreciable cost savings.

The above example is intended to show the general possibilities of the novel tire construction of my invention. Each tire size nd type would present a different set of conditions. Also, the figures used in this one example are illustrative only and no attempt has been made to make them absolutely exact.

The general object of the present invention is to produce a tire having a plurality of reinforcing plies therein some of such plies having cords positioned therein on the bias whereas another ply or plies in the tire has or have the reinforcing cords positioned therein at a zero degree bias, which is extending straight or radially across the tire.

Another object of the invention is to reduce the amount of reinforcing fabric required in a tire.

Another object of the invention is to provide a commercially acceptable and satisfactory tire which utilizes wire or other types of metallic reinforcing cords in one or more plies in the tire, and which has desirable load support and riding characteristics and operational life.

Yet another object of the invention is to provide a tire which has some radially positioned reinforcing cords therein and some reinforcing plies with the cords therein on the bias, which radially directed cords are made from steel, wire or other suitable material to provide maximum strength in the tire with a minimum amount of material.

Still another object of the invention is to minimize the compressive stresses in reinforcing cords in a tire and still obtain the desired steering stability and lateral stability of the conventional bias reinforced type of tire.

A further object of the invention is to provide a novel type of a pneumatic tire which can be built substantially in accordance with conventional practice but which is made from smaller amounts of fabric reinforcing material than are conventional tires, and which tires may have superior physical properties to previous types of tires.

The foregoing and other advantages of the invention will be made more apparent as the specification proceeds.

For a better understanding of the invention, reference is directed to the accompanying drawings wherein several embodiments of pneumatic tires embodying the principles of the present invention are illustrated, and wherein:

Fig. 1 is a perspective view, partially broken away and shown in section, of a pneumatic tire constructed in accordance with the principles of this invention;

Fig. 2 is a more or less diagrammatic plan view of the tire of Fig. 1 showing the reinforcing plies thereof as applied to a tire building drum; and Figs. 3 and 4 are diagrammatic views indicating other reinforcing fabric combinations that can be used in constructing tires in accordance with the invention.

In referring to textile material for forming reinforcing cords for tires, this term is taken to include cotton, rayon, nylon, and any other equivalent material that may be suitable for use in forming reinforcing cords in pneumatic tires. Metal as specifically used in referring to ply construction includes any suitable high strength metal or its alloys, but usually steel, for making tire cords and it includes twisted cables, braids, or other suitable forms generally referred to herein as cords.

With reference to the details of the structure shown in the drawings, a pneumatic tire is illustrated in Fig. 1 and is referred to in general by the numeral 1. This tire 1 is constructed in general from conventional tire forming materials and include a pair of beads 2, and a plurality of reinforcing plies 3, 4, 5 and 6, with ply 6 being the first ply of the tire and ply 3 actually being the fourth ply applied to the tire in building it.

It is a very important feature of the present invention that continuous reinforcing cords 7 in the ply 3 and similar cords 8 in the ply 4 extend radially (at a zero degree angle of bias) in the tire 1 from bead to bead thereof whereas sets of cords 9 and 10, and 11 and 12 in the plies 5 and 6, respectively, extend at substantially conventional bias angles. In order to provide the tire construction of the invention, it is necessary that the sets of cords 9 and 10 used in forming the ply 5 and the sets of cords 11 and 12 used in forming the ply 6 be spliced or overlapped intermediate the beads of the tire 1. Thus each of the plies 5 and 6 may be considered to be made from two different pieces of material united by overlapping portions of the plied material and pressing them together. The spliced portions of the plies 5 and 6 form a section that extends lengthwise of the ply so that such spliced section or zone in a fabric ply extends circumferentially of the tire 1, as it is ultimately constructed.

Usually the plies 3, 4, 5 and 6 may have all of the reinforcing cords therein made from textile material although it is an important feature of the invention that the radially extending plies 3 and 4 may have the cords 7 and 8 therein formed from steel wire, wire braid, wire cable, or other suitable metallic material.

Fig. 3 shows a different embodiment of the invention wherein a tire 13 is shown and it illustrates a pair of bias plies 14 and 15 the reinforcing cords of which extend on a conventional bias angle in the tire, which plies are made with lapped reinforcing cords as disclosed hereinbefore. Additional plies 16 and 17 are provided with the cords therein extending substantially radially of the tire and the ply 16 is shown as made from spliced reinforcing cords whereas the ply 17 has continuous cords therein. Obviously the plies may be formed from any suitable material and either one or both of the plies 16 and 17 may be formed from metallic cords or similar material.

Fig. 4 shows a tire 18 which has two bias type reinforcing cord plies 19 and 20 therein with both such plies utilizing the spliced construction that has been referred to hereinbefore. Only one additional ply 21 is provided in the tire 18 and it has the reinforcing cords therein also spliced like the plies 19 and 20, and wherein the reinforcing cords extend radially of the tire 18. In the tire 18, "radially" is strictly construed since there is no balancing ply provided if the cords therein had even a low bias angle.

As previously indicated with reference to the other tires of the invention, the cords in the plies may be made from any desired material, and the ply 21, which may have continuous cords therein, is particularly well suited to be made from metallic material, if desired.

From the foregoing, it will be seen that a novel type of a tire has been provided by the invention wherein certain of the reinforcing plies have the cords therein extending on a conventional bias angle in the tire, whereas the other reinforcing ply or plies has or have the cords therein extending substantially radially of the tire. As indicated in the drawings, the bias type cords are used in pairs of plies with the actual bias angle of the cords in the different plies being the same but with the cords being oppositely inclined with relation to the imaginary line parallel to the axis of the tire and with which the bias angle is measured. It previously has been indicated herein that "radially" extending cords may mean cords having bias angle up to as high as 15 or 20 degrees in the shaped tire. Usually the cords in the bias-cut reinforcing plies, when on the building drum, have a bias angle of approximately 30 degrees, whereas such cords when present in a finished tire have a bias angle in the tread region of approximately 47 to 52 degrees.

By the tire construction shown, it is possible to provide a tire with desirable properties but effect a savings in the amount of reinforcing fabric or cords used in the tire. Furthermore, the present invention greatly facilitates use of wires, or other metallic material, as a reinforcing cord in a pneumatic tire. It will be noted that the lapped or spliced portions of the different plies in a given tire are usually spaced transversely of the tire as shown in Fig. 2 although the laps may be at the center.

The present invention utilizes the tire building method disclosed and claimed in my copending application previously referred to herein. Other conventional components of tires not referred to specifically herein are present in the tire to complete same.

If it is necessary to facilitate relative movement between the cords in adjacent plies during the tire shaping operation, these plies may be lubricated suitably in the spliced region thereof and zinc stearate powder or paste is one desirable substance that can be used for this purpose. Stretching of the tire as it is shaped may be limited, if necessary, by any suitable means some if which are described in my said application referred to hereinbefore.

The lap of the spliced cords in a finished tire will be about ¾" for ordinary size rayon cord and possibly 1¼" for the lapped wires in a wire tire. These lapped portions of the reinforcing plies will be approximately as strong as the cord itself due to the strength of the bond of the lapped cords and the rubber tire carcass. Of course, a greater length or amount of fabric would normally be required in the tire of the invention than in a conventional tire because of the laps provided therein and it is thought that such greater amount of fabric totals to about three or four per cent more than that used in conventional tires.

While several complete embodiments of the invention have been disclosed herein, it will be appreciated that modifications of these particular embodiments of the invention may be resorted to without departing from the scope of the invention as defined by the appended claims.

Having thus described my invention, what I claim is:

1. A drum built pneumatic tire having two reinforcing plies of wire cord material and at least one pair of reinforcing plies of textile cord material, said wire cord plies being at substantially zero degrees bias and having wires therein extending continuously from bead to bead of the tire, the plies of said pair of textile cord plies being oppositely directed and on a bias of from 30° to 60° and each being made of two parts by means of a lap splice extending lengthwise of the ply, the cords in the spliced plies being overlapped about ¾ of an inch.

2. A drum built pneumatic tire having one reinforcing ply of wire cord material and one pair of reinforcing plies of textile cord material, said wire cord ply being at substantially zero degrees bias and having wires therein extending continuously from bead to bead of the tire, the plies of said pair of textile cord plies being oppositely directed and on a bias of from 30° to 60° and each being made of two parts by means of a lap splice extending lengthwise of the ply, the cords in the spliced plies being overlapped about ¾ of an inch.

References Cited in the file of this patent

UNITED STATES PATENTS

| | | |
|---|---|---|
| 1,165,576 | Dech | Dec. 28, 1915 |
| 1,364,870 | Ehle | Jan. 11, 1921 |
| 1,579,817 | Keith | Apr. 6, 1926 |
| 1,581,743 | Kearns et al. | Apr. 20, 1926 |
| 1,818,944 | Darrow | Aug. 11, 1931 |
| 1,853,827 | Mallory | Apr. 12, 1932 |
| 2,225,042 | Elliott | Dec. 17, 1940 |
| 2,310,776 | Gay | Feb. 9, 1943 |
| 2,498,859 | Lessig | Feb. 28, 1950 |

FOREIGN PATENTS

| | | |
|---|---|---|
| 251,206 | Great Britain | Apr. 29, 1926 |